United States Patent
Parans Paranthaman et al.

(10) Patent No.: US 9,620,783 B2
(45) Date of Patent: Apr. 11, 2017

(54) MESOPOROUS METAL OXIDE MICROSPHERE ELECTRODE COMPOSITIONS AND THEIR METHODS OF MAKING

(71) Applicant: UT-Battelle, LLC, Oak Ridge, TN (US)

(72) Inventors: Mariappan Parans Paranthaman, Knoxville, TN (US); Zhonghe Bi, Cookeville, TN (US); Craig A. Bridges, Oak Ridge, TN (US); Gilbert M. Brown, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 204 days.

(21) Appl. No.: 14/539,094

(22) Filed: Nov. 12, 2014

(65) Prior Publication Data
US 2015/0069307 A1 Mar. 12, 2015

Related U.S. Application Data

(62) Division of application No. 13/645,948, filed on Oct. 5, 2012, now Pat. No. 8,911,904.

(51) Int. Cl.
*H01M 4/62* (2006.01)
*H01M 4/48* (2010.01)
(Continued)

(52) U.S. Cl.
CPC ............ *H01M 4/624* (2013.01); *C01B 25/45* (2013.01); *C01G 23/0536* (2013.01);
(Continued)

(58) Field of Classification Search
None
See application file for complete search history.

(56) References Cited

U.S. PATENT DOCUMENTS 7,678,503 B2 3/2010 Manthiram et al.
7,718,319 B2 5/2010 Manthiram et al.
(Continued)

FOREIGN PATENT DOCUMENTS

CN 102034975 A 4/2011
CN 102239586 A 11/2011
(Continued)

OTHER PUBLICATIONS

Ding, Zijing et al., "Towards Understanding the Effects of Carbon and Nitrogen-Doped Carbon Coating," Phys. Chem. Chem Phys., vol. 13, 2011, pp. 15127-15133.
(Continued)

*Primary Examiner* — Patrick Ryan
*Assistant Examiner* — Christopher Domone
(74) *Attorney, Agent, or Firm* — Brinks, Gilson & Lione

(57) ABSTRACT

Compositions and methods of making are provided for treated mesoporous metal oxide microspheres electrodes. The compositions include microspheres with an average diameter between about 200 nanometers and about 10 micrometers and mesopores on the surface and interior of the microspheres. The methods of making include forming a mesoporous metal oxide microsphere composition and treating the mesoporous metal oxide microspheres by at least annealing in a reducing atmosphere, doping with an aliovalent element, and coating with a coating composition.

5 Claims, 5 Drawing Sheets

(51) Int. Cl.

| | | |
|---|---|---|
| H01M 4/86 | (2006.01) | |
| C01G 23/08 | (2006.01) | |
| H01M 4/485 | (2010.01) | |
| C01G 23/053 | (2006.01) | |
| C01G 23/07 | (2006.01) | |
| C01B 25/45 | (2006.01) | |
| H01M 10/0525 | (2010.01) | |
| H01M 4/58 | (2010.01) | |
| H01M 10/054 | (2010.01) | |
| H01M 4/02 | (2006.01) | |

(52) U.S. Cl.
CPC ............ *C01G 23/07* (2013.01); *C01G 23/08* (2013.01); *H01M 4/483* (2013.01); *H01M 4/485* (2013.01); *H01M 4/8605* (2013.01); *C01P 2002/52* (2013.01); *C01P 2002/54* (2013.01); *C01P 2004/32* (2013.01); *C01P 2006/12* (2013.01); *C01P 2006/16* (2013.01); *C01P 2006/40* (2013.01); *H01M 4/5825* (2013.01); *H01M 10/054* (2013.01); *H01M 10/0525* (2013.01); *H01M 2004/021* (2013.01); *Y02E 60/122* (2013.01); *Y02E 60/50* (2013.01)

(56) References Cited

U.S. PATENT DOCUMENTS

| 7,986,509 | B2 | 7/2011 | Seymour | |
|---|---|---|---|---|
| 8,722,250 | B2* | 5/2014 | Park | H01M 4/366 252/519.1 |
| 2004/0131934 | A1* | 7/2004 | Sugnaux | B82Y 20/00 429/209 |
| 2011/0070495 | A1 | 3/2011 | Ban et al. | |
| 2011/0084229 | A1 | 4/2011 | Kawakami et al. | |
| 2011/0245071 | A1 | 10/2011 | Tanabe | |
| 2011/0281157 | A1 | 11/2011 | Seymour | |
| 2011/0281174 | A1 | 11/2011 | Seymour | |
| 2011/0281176 | A1* | 11/2011 | Seymour | H01G 11/36 429/321 |

FOREIGN PATENT DOCUMENTS

| JP | 2006310514 A | 11/2006 |
|---|---|---|
| JP | 2007269505 A | 10/2007 |
| JP | 2009196839 A | 9/2009 |
| JP | 2010009807 A | 1/2010 |
| WO | WO 2010/090185 A1 | 8/2010 |
| WO | WO 2011/109457 A2 | 9/2011 |

OTHER PUBLICATIONS

Hu, Jiezi et al., "Doping Effects on Electronic Conductivity and Electrochemical Performance of LiFePO$_4$," J. Mater. Sci. Technol., vol. 25, No. 3, 2009, pp. 405-409.

Li, Xifei et al., "Superior Cycle Stability of Nitrogen-Doped Graphene Nanosheets as Anodes for Lithium Ion Batteries," Electrochemistry Communications, vol. 13, 2011, pp. 822-825.

Li, Hong et al., "Research on Advanced Materials for Li-ion Batteries," Advanced Materials, vol. 21, 2009, pp. 4593-4607.

Parans Paranthaman, M., "Controlled Surface Modification of LiMn$_{1.5}$Ni$_{0.5}$O$_4$ Spinel Cathode Materials for Lithium-ion Batteries," Abstract #398, 220$^{th}$ ECS Meeting, The Electrochemical Society, 2011, 1 page.

* cited by examiner

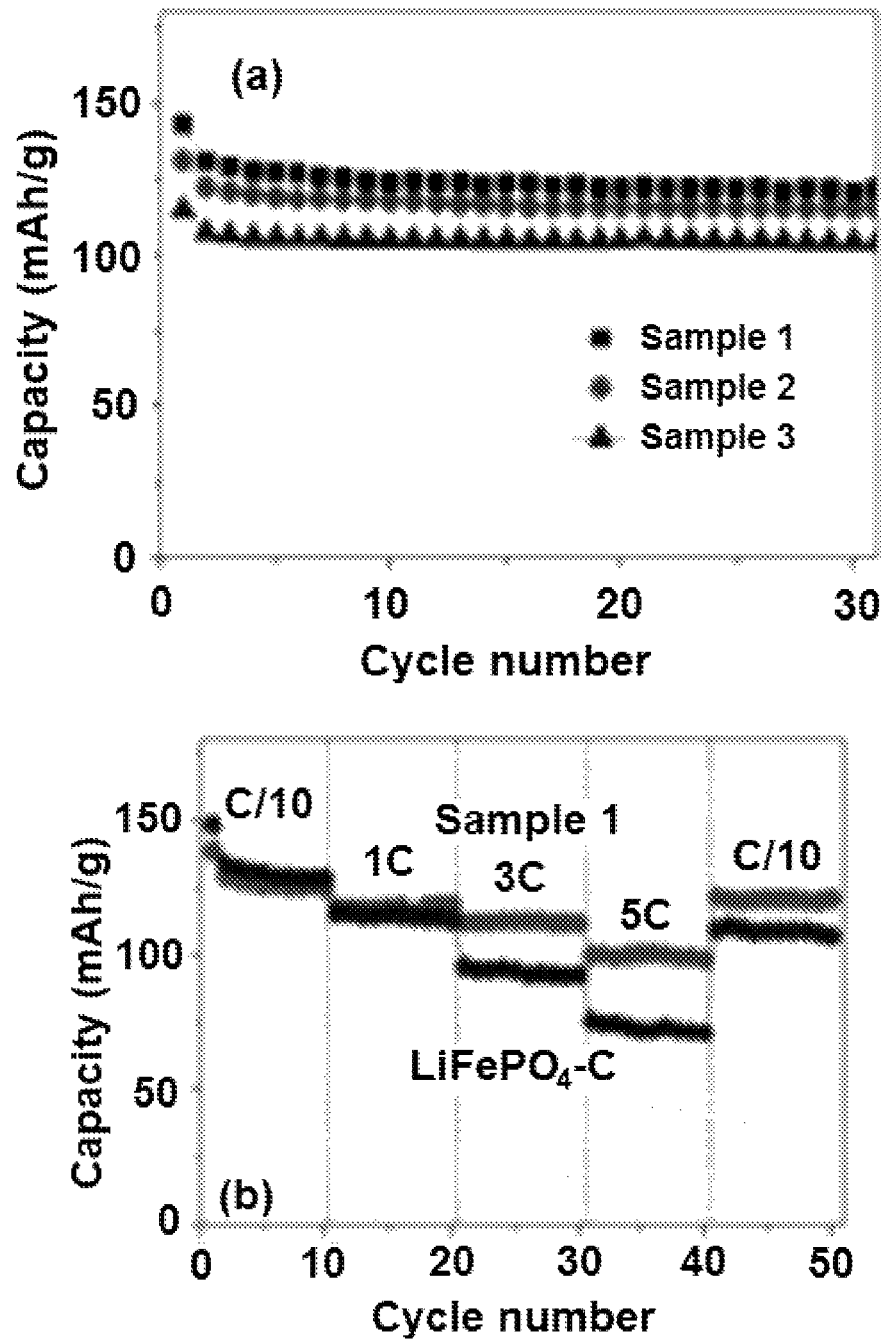
FIG. 4A (top) / FIG. 4B (bottom)

MESOPOROUS METAL OXIDE MICROSPHERE ELECTRODE COMPOSITIONS AND THEIR METHODS OF MAKING

CROSS-REFERENCE TO RELATED APPLICATIONS

The present application is a divisional of U.S. Ser. No. 13/645,948, filed Oct. 5, 2012, the contents of which are incorporated into the present application by reference in their entirety.

STATEMENT OF GOVERNMENT INTEREST

The invention was made with government support under contract number DE-AC05-00OR22725 by the Department of Energy. The Government has certain rights in the invention.

BACKGROUND

Advanced energy storage systems such as lithium-ion batteries are important approaches to mitigate energy shortage and global climate warming issues that the world is currently facing. High power and high energy density are essential to batteries for applications in electric vehicles, stationary energy storage systems for solar and wind energy, as well as smart grids. Because conventional lithium-ion batteries are inadequate to meet these needs, advanced materials with high capacity and fast charge-discharge capability are desirable for next generation lithium-ion batteries. Titanium dioxide ($TiO_2$) and various polymorphs (anatase, rutile, and $TiO_2$—B (bronze)) have been widely investigated as lithium-ion battery anode materials, due to their advantages in terms of cost, safety, and rate capability. In particular, the polymorph of $TiO_2$—B has shown a favorable channel structure for lithium mobility, which results in fast charge-discharge capability of a lithium cell. It has been identified that the lithium intercalation in $TiO_2$—B features a pseudocapacitive process, rather than the solid-state diffusion process observed for anatase and rutile. Theoretical studies have uncovered that this pseudocapacitive behavior originates from the unique sites and energetics of lithium absorption and diffusion in $TiO_2$—B structure. As a result, $TiO_2$—B nanoparticles, nanotubes, nanowires, and nanoribbons have been reported as anode materials with good rate performance for lithium-ion batteries. These nanomaterials displayed attractive battery performance; however, they also have some disadvantages, e.g., poor electronic conduction network due to aggregation of nanopowders, loss of particle connection during cycling, and low packing density.

Mesoporous materials ($LiFePO_4$ and $TiO_2$) with micrometer-sized particles were found to be able to overcome these shortcomings, yet still maintain the advantages of nanomaterials. The properties of mesoporous materials ensure high contact area between electrolyte and electrode, short diffusion distances for Li+ transport, and good accommodation of strain during cycling. The general concern for mesoporous materials is the long transport distance of electrons in micrometer sized particles. Conductive carbon and $RuO_2$ coatings have thus been employed to improve the high rate performance of lithium storage in mesoporous $TiO_2$ materials.

However, one concern for mesoporous materials is the long transport distance of electrons in micron sized particles, especially for low conductivity $TiO_2$. Therefore, improving the electronic conductivity of $TiO_2$ may be important for such mesoporous metal oxide (e.g., $TiO_2$) materials. One method of increasing the electronic conductivity of $TiO_2$ is to modify the bandgap of a pure $TiO_2$ by different doping schemes, such as iron-, tungsten-, or nitrogen-doped $TiO_2$ nanoparticles and nanotubes, have been used as anode materials for lithium-ion batteries and confirmed to exhibit better capacity and rate capability. However, an inherent obstacle relates to the fact that the thermodynamic solubility for substitutional doping of $TiO_2$ is extremely low for most dopants. Doping would be of no help in providing mobile charge carriers if the dopants are mainly located at undesirable interstitial sites as opposed to substitutional doping. Recently a non-compensated n-p co-doping concept has been reported to enable to enhance the visible-light photoactivity of $TiO_2$ by narrowing its band gap. Therefore, it is highly desirable to develop a treated (e.g., doped) metal oxide compound with the morphology of mesoporous microspheres that could combine the advantages of mesoporous structure, spherical morphology, and improved electronic conductivity.

SUMMARY

Compositions and methods of making are disclosed for mesoporous metal oxide microsphere electrodes for use in batteries.

In one embodiment, the electrode for the battery comprises a treated mesoporous transition metal oxide microsphere composition having microspheres with an average diameter between 200 nanometers (nm) and 10 micrometers (μm). The electrode further comprises mesopores on the surface and interior of the microspheres, wherein the mesopores have an average diameter between 1 nm and 50 nm. In certain embodiments, the surface area of the mesoporous microspheres is between 50 and 500 $m^2/g$. The composition in the electrode further comprises an electrical conductivity of at least $1 \times 10^{-7}$ S/cm at 25° C. and 60 MPa. In some embodiments, the composition has at least a 250% higher conductivity when compared with a similar non-treated mesoporous microsphere metal oxide microsphere composition at similar temperature and pressure.

In some embodiments, the metal oxide is a transition metal oxide selected from the group consisting of: titanium oxides, vanadium oxides, chromium oxides, manganese oxides, iron oxides, cobalt oxides, nickel oxides, copper oxides, zinc oxides, niobium oxides, tantalum oxides, molybdenum oxides, tungsten oxides, ruthenium oxides, palladium oxides, cadmium oxides, zirconium oxides, hafnium oxides, and combinations thereof. In one particular embodiment, the metal oxide comprises at least one polymorph of titanium dioxide having at least 50 wt. % of a $TiO_2$ anatase polymorph or at least 50 wt. % of a $TiO_2$—B polymorph.

In some embodiments, the mesoporous metal oxide microsphere composition is annealed in a reducing atmosphere. The reducing atmosphere may be selected from the group consisting of: hydrogen, argon, nitrogen, carbon dioxide, and mixtures thereof.

In some embodiments, the composition is doped with a compound having an aliovalent element selected from the group consisting of: alkali metals, alkaline earth metals, transition metals, lanthanides, actinides, post-transition metals, metalloids, non-metals, and combinations thereof. In some embodiments, the composition is doped with a compound having an aliovalent element selected from the group consisting of chromium, manganese, cobalt, iron, copper, zinc, nitrogen, and combinations thereof. In one particular embodiment, the composition is doped with compounds having chromium and nitrogen. The composition may be doped with between 2 mol. % and 5 mol. % of the aliovalent element.

In some embodiments, the composition is coated with a coating composition selected from the group consisting of nitrides, oxides, carbides, halides, borides, phosphides, and combinations thereof.

In another embodiment, a battery comprises an anode having a treated mesoporous metal oxide microsphere composition, wherein the composition comprises (a) microspheres with an average diameter between 200 nm and 10 µm, (b) mesopores on the surface and interior of the microspheres, wherein the mesopores have an average diameter between 1 nm and 50 nm and the microspheres have a surface area between 50 m$^2$/g and 500 m$^2$/g, and (c) an electrical conductivity of at least $1 \times 10^{-7}$ S/cm at 25° C. and 60 MPa. The battery further comprises a cathode and an electrolyte capable of supporting reversible deposition and stripping of metal at the anode, and reversible intercalation and deintercalation of the metal at the cathode. In certain embodiments, the mesopores in the mesoporous metal oxide microspheres are substantially uniformly distributed throughout the surface and the interior of the microspheres.

In some embodiments, the transition metal oxide in the anode of the battery is selected from the group consisting of: titanium oxides, vanadium oxides, chromium oxides, manganese oxides, iron oxides, cobalt oxides, nickel oxides, copper oxides, zinc oxides, niobium oxides, tantalum oxides, molybdenum oxides, tungsten oxides, ruthenium oxides, palladium oxides, cadmium oxides, zirconium oxides, hafnium oxides, and combinations thereof. In one particular embodiment, the metal oxide comprises at least one polymorph of titanium dioxide having at least 50 wt. % of a $TiO_2$ anatase polymorph or at least 50 wt. % of a $TiO_2$—B polymorph.

In some embodiments, the treated mesoporous metal oxide microsphere composition in the anode is annealed in a reducing atmosphere selected from the group consisting of: hydrogen, argon, nitrogen, carbon dioxide, and mixtures thereof.

In some embodiments, the composition in the anode is doped with a compound having an aliovalent element selected from the group consisting of: alkali metals, alkaline earth metals, transition metals, lanthanides, actinides, post-transition metals, metalloids, non-metals, and combinations thereof. In some embodiments, the composition is doped with a compound having an aliovalent element selected from the group consisting of chromium, manganese, cobalt, iron, copper, zinc, nitrogen, and combinations thereof. In one particular embodiment, the composition is doped with chromium and nitrogen. The composition may be doped with between 2 mol. % and 5 mol. % of the aliovalent element.

In some embodiments, the composition in the anode is coated with a coating composition selected from the group consisting of nitrides, oxides, carbides, halides, borides, phosphides, and combinations thereof.

In some embodiments, the battery is selected from the group consisting of the following battery types: lithium-ion, aluminum-ion, magnesium-ion, sodium-ion, metal-air, and metal-sulfur, wherein the metal is lithium, aluminum, magnesium, zinc, or sodium. In one particular embodiment, the battery is a lithium-ion battery.

In some embodiments, the battery has at least a 25% higher capacity at a rate of C/10, at least a 75% higher capacity at a rate of 1 C, and/or at least a 300% higher capacity at a rate of 10 C, when compared with a similar battery having a mesoporous metal oxide metal oxide microsphere that has not been treated, at the same cycle number. In other embodiments, the battery has a capacity of at least 250 mAh/g at a rate of C/10, a capacity of at least 200 mAh/g at a rate of 1 C, or a capacity of at least 127 mAh/g at a rate of 10 C. In yet other embodiments, the battery is capable of charging from 0% to 50% of the full range capacity in 6 minutes, or an ability to charge from 0% to 33% of the full range capacity in 1 minute. In yet other embodiments, the battery has a functional discharge capacity of at least 90% of the initial discharge capacity after 100 cycles.

In some embodiments, the battery is used in a grid storage application, vehicle battery application, military application, portable electronic device application, medical device application, or standard cell size battery application.

In another embodiment, a method of making a treated mesoporous metal oxide microsphere electrode comprises forming a mesoporous metal oxide microsphere composition having: (a) microspheres with an average diameter between 200 nm and 10 µm, and (b) mesopores on the surface and interior of the microspheres, wherein the mesopores have an average diameter between 1 nm and 50 nm and the microspheres have a surface area between 50 m$^2$/g and 500 m$^2$/g. The method further comprises treating the mesoporous metal oxide microspheres by at least one method selected from the group consisting of: (i) annealing in a reducing atmosphere, (ii) doping with a compound having an aliovalent element, and (iii) coating with a coating composition. In some embodiments, the metal oxide may have at least one polymorph of titanium dioxide having at least 50 wt. % of a $TiO_2$ anatase polymorph or at least 50 wt. % of a $TiO_2$—B polymorph.

In some embodiments, the treating step is carried out by annealing the mesoporous metal oxide microspheres, and the reducing atmosphere is selected from the group consisting of: hydrogen, argon, nitrogen, carbon dioxide, and mixtures thereof.

In other embodiments, the treating step is carried out by doping the mesoporous metal oxide microspheres, and the aliovalent element is selected from the group consisting of: alkali metals, alkaline earth metals, transition metals, lanthanides, actinides, post-transition metals, metalloids, non-metals, and a combination thereof. In certain embodiments, the aliovalent element may be selected from the group consisting of chromium, manganese, cobalt, iron, copper, zinc, nitrogen, and combinations thereof. In certain embodiments, the doping comprises the addition of between 2 mol. % and 5 mol. % of the aliovalent element to the mesoporous metal oxide microspheres.

In other embodiments, the treating step is carried out by coating the mesoporous metal oxide microspheres, and the coating composition is selected from the group consisting of nitrides, oxides, carbides, halides, borides, phosphides, and combinations thereof.

BRIEF DESCRIPTION OF THE DRAWINGS

FIG. 4(A) depicts the cycling performance of coated $LiFePO_4$ samples at C/10.

FIG. 4(B) depicts the cycling performance of coated $LiFePO_4$ samples at C/10, 1 C, 3 C, and 5 C.

DETAILED DESCRIPTION

Figure 1:
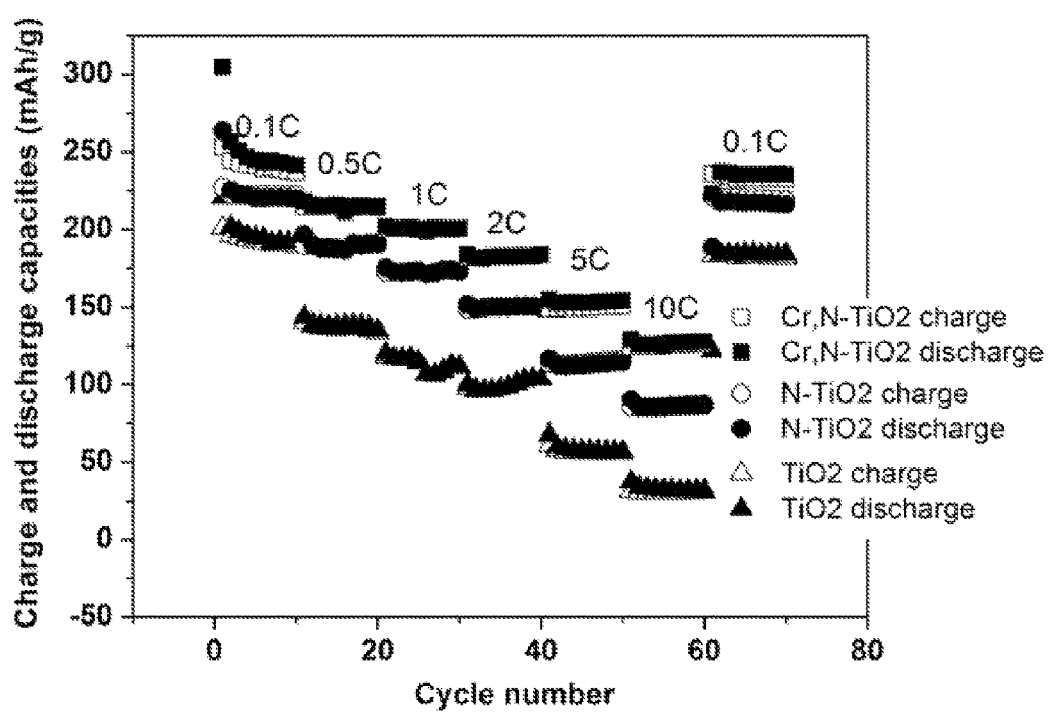
FIG. 1 depicts the rate performance (capacity) of untreated mesoporous $TiO_2$ anatase microparticle electrodes, as well as nitrogen doped and nitrogen-chromium codoped mesoporous $TiO_2$ anatase microparticle electrodes at various current rates between C/10 and 10 C.

As used herein, the singular forms "a," "an," and "the" include plural referents unless the context clearly dictates otherwise. For example, reference to "a substituent" encompasses a single substituent as well as two or more substituents, and the like.

As used herein, the terms "for example," "for instance," "such as," or "including" are meant to introduce examples that further clarify more general subject matter. Unless otherwise specified, these examples are provided only as an aid for understanding the applications illustrated in the present disclosure, and are not meant to be limiting in any fashion.

As used herein, the following terms have the following meanings unless expressly stated to the contrary. It is understood that any term in the singular may include its plural counterpart and vice versa.

As used herein, the term "lithium-ion" may refer to any ion comprising lithium, including but not limited to $Li^+$.

As used herein, the term "cycle" may refer to the discharge and charge of the capacity of the battery.

As used herein, the term "functional discharge capacity" may refer to a comparison between the current capacity of the battery and the battery's initial capacity. In certain embodiments, the battery is still operable when the functional discharge capacity is more than 50%, 60%, 70%, 80%, or 90% of the initial discharge capacity.

As used herein, the terms "secondary" and "secondary battery" may refer to rechargeable batteries wherein the electrochemical reactions are electrically reversible (i.e., the reaction can be reversed by running a current into the cell to restore the capacity of the battery). In certain embodiments, the secondary battery can achieve a number of cycles (e.g., 100, 1000, 5000, or 10000 cycles) while maintaining a functional discharge capacity (e.g., the discharge capacity is more than 50%, 60%, 70%, 80%, or 90% of the initial discharge capacity).

As used herein, the terms "mesoporous" and "mesoporous structure" may refer to a material or composition containing pores. In certain embodiments, the average pore size of the microsphere structure is between 1 nanometer (nm) and 50 nm. In other embodiments, the average pore diameter in the microsphere structure is between 5 nm and 20 nm. In yet other embodiments, the average pore diameter is between 10 nm and 15 nm. In one particular embodiment, the average pore diameter in the microsphere structure is approximately 12 nm.

As used herein, the term "$TiO_2$" may refer to a titanium dioxide polymorph structure. In certain embodiments, $TiO_2$ may refer to a titanium oxide polymorph structure selected from the group consisting of rutile, anatase, brookite, $TiO_2$—H (Hollandite-like), $TiO_2$—R (Ramsdellite-like), $TiO_2$—II ($\alpha$-$PbO_2$-like), $TiO_2$—OI, $TiO_2$—OII (Cotunnite-like), $TiO_2$—B, and combinations thereof. In one particular embodiment, the mesoporous microsphere composition comprises the $TiO_2$ anatase polymorph. In another embodiment, the mesoporous microsphere composition comprises the $TiO_2$—B polymorph. The $TiO_2$—B polymorph may be synthesized through the hydrolysis of $K_2Ti_4O_9$ followed by heating; the $TiO_2$—H polymorph may be synthesized by oxidation of related potassium titanate bronzes: $K_{0.25}TiO_2$; and the $TiO_2$—R polymorph may be synthesized by oxidation of related lithium titanate bronzes: $Li_{0.5}TiO_2$.

As used herein, the terms "C/10," "C/2," "1 C," "2 C," "5 C," "10 C," "20 C," "30 C," "60 C," and the like refer to the "C-rate" or charge-discharge rate (Amp-hour) of the battery.

As used herein, the terms "treating" or "treated" may refer to the process or resulting electrode composition that has been processed or reacted in some manner to improve the conductivity of the composition, thereby improving the rate capability and/or cycling performance of the composition. In some embodiments, the composition is treated through an annealing step, doping step, coating step, or combination thereof.

It has been discovered that mesoporous metal oxide microsphere electrode compositions are capable of improved capacity, faster charge-discharge capabilities, and longer lifetimes in comparison to the current battery technology. Discussions of such discoveries are disclosed in U.S. patent application Ser. No. 13/372,795, incorporated by reference herein. It has also been discovered that performance properties of the electrode compositions may be further improved by subjecting or "treating" the composition to post-annealing, doping, coating, or a combination thereof.

In certain embodiments, batteries with mesoporous metal oxide microsphere electrode compositions may be used in grid storage applications, vehicle battery applications, military applications, portable electronic device applications, medical device applications, or standard cell size battery applications. In one particular embodiment, a battery with a mesoporous metal oxide microsphere electrode composition is used for a grid storage application. In another particular embodiment, the battery is used in a vehicle battery application. In yet another particular embodiment, the battery is used in a portable electronic device application.

In certain embodiments, the improved battery comprises: (1) an anode having a mesoporous metal oxide microsphere composition, (2) a cathode, and (3) an electrolyte capable of supporting reversible deposition and stripping of metal at the anode, and reversible intercalation and deintercalation of the metal at the cathode.

In certain embodiments, the mesoporous metal oxide microsphere composition is used as an electrode in one of the following types of batteries: lithium-ion battery, aluminum-ion battery, magnesium-ion battery, sodium-ion battery, metal-air (wherein the metal is lithium, aluminum, magnesium, zinc, or sodium) battery, and metal-sulfur (wherein the metal is lithium, aluminum, magnesium, zinc, or sodium) battery. In one particular embodiment, the mesoporous metal oxide microsphere composition is an electrode in a lithium-ion battery.

Anode

In certain embodiments, the anode composition comprises metal oxide microspheres with a spherical morphology and mesopores. As prepared, the spherical metal oxide microspheres typically comprise a size distribution having a unimodal peak or average particle size. In some embodiments, the average microsphere diameter is between 200 nanometers (nm) and 10 micrometers (μm). In other embodiments, the average metal oxide microsphere diameter is between 500 nm and 5 μm. In yet other embodiments, the average microsphere diameter is between 1 μm and 2 μm. In one particular embodiment, the average microsphere diameter is approximately 1 μm.

In certain embodiments, the mesopores in the microsphere structure have an average pore diameter between 1 nm and 50 nm. In other embodiments, the average pore diameter in the microsphere structure is between 5 nm and 20 nm. In yet other embodiments, the average pore diameter is between 10 nm and 15 nm. In one particular embodiment, the average pore diameter in the microsphere structure is approximately 12 nm.

In certain embodiments, the microspheres in the mesoporous metal oxide microsphere structure are comprised of nanocrystallites or nanograins having an average grain diameter between 1 nm and 20 nm. In another embodiment, the average grain diameter of the nanocrystallites is between 5 nm and 10 nm. In one particular embodiment, the average grain diameter is approximately 6 nm.

With regard to the location of the mesopores in the microsphere structure, in certain embodiments, the pore sites are substantially uniformly distributed throughout the microsphere structure (i.e., on the surface and throughout the interior of the spherical microspheres).

In certain embodiments, the mesoporous metal oxide microsphere structure has a surface area between 50 $m^2/g$ and 500 $m^2/g$. In another embodiment, the surface area is between 100 $m^2/g$ and 300 $m^2/g$. In another embodiment, the surface area of the mesoporous metal oxide microsphere structure is between 100 $m^2/g$ and 200 $m^2/g$.

In certain embodiments, the metal oxide in the mesoporous microsphere composition is a transition metal oxide. In certain embodiments, the transition metal oxide is selected from the group consisting of titanium oxides (e.g., titanium dioxide and its polymorphs), vanadium oxides, chromium oxides, manganese oxides, iron oxides, cobalt oxides, nickel oxides, copper oxides, zinc oxides, niobium oxides, tantalum oxides, molybdenum oxides, tungsten oxides, ruthenium oxides, palladium oxides, cadmium oxides, zirconium oxides, hafnium oxides, and combinations thereof. In one particular embodiment, the metal oxide is a titanium oxide. In another embodiment, the metal oxide is a nickel oxide.

In certain embodiments, the mesoporous microsphere composition is a titanium oxide selected from the following titanium dioxide polymorphs consisting of rutile, anatase, brookite, $TiO_2$—H (Hollandite-like), $TiO_2$—R (Ramsdellite-like), $TiO_2$—II (α-$PbO_2$-like), $TiO_2$—OI, $TiO_2$—OII (Cotunnite-like), $TiO_2$—B, and combinations thereof. In one particular embodiment, the mesoporous microsphere composition comprises the $TiO_2$ anatase polymorph. In another particular embodiment, the mesoporous microsphere composition comprises the $TiO_2$—B polymorph. As discussed above, the $TiO_2$—B polymorph may be synthesized through the hydrolysis of $K_2Ti_4O_9$ followed by heating; the $TiO_2$—H polymorph may be synthesized by oxidation of related potassium titanate bronzes: $K_{0.25}TiO_2$; and the $TiO_2$—R polymorph may be synthesized by oxidation of related lithium titanate bronzes: $Li_{0.5}TiO_2$.

In some embodiments, the mesoporous microsphere composition comprises a material composition having more than 50 wt. % of the $TiO_2$ anatase polymorph (i.e., the majority phase of the mesoporous microsphere composition is the $TiO_2$ anatase phase). In other embodiments, the mesoporous microsphere comprises a material composition having more than 60 wt. %, 70 wt. %, 80 wt. %, or 90 wt. % of the $TiO_2$ anatase polymorph. In some embodiments, the remaining percentage of the mesoporous microsphere composition is primarily comprised of the rutile and/or anatase polymorph. In some embodiments, the mesoporous microsphere comprises a material composition of approximately 100 wt. % of the $TiO_2$ anatase polymorph.

In some embodiments, the mesoporous microsphere composition comprises a material composition having more than 50 wt. % of the $TiO_2$—B polymorph (i.e., the majority phase of the mesoporous microsphere composition is the $TiO_2$—B phase). In other embodiments, the mesoporous microsphere comprises a material composition having more than 60 wt. %, 70 wt. %, 80 wt. %, or 90 wt. % of the $TiO_2$—B polymorph. In some embodiments, the remaining percentage of the mesoporous microsphere composition is primarily comprised of the rutile and/or anatase polymorph. In some embodiments, the mesoporous microsphere comprises a material composition of approximately 100 wt. % of the $TiO_2$—B polymorph.

In certain embodiments, the mesoporous microsphere composition is treated in order to improve the composition's conductivity and further improve the composition's rate capability and/or cycling performance. In some embodiments, the composition is annealed in a reducing atmosphere that may include a vacuum or flowing reducing gas to at least partially reduce the metal (e.g., titanium) in the composition. In certain embodiments, the reducing atmosphere is an inert gas. In some embodiments, the reducing atmosphere is a vacuum. In other embodiments, the reducing atmosphere contains a gas selected from the group consisting of: hydrogen, argon, nitrogen, fluorine, sulfur, carbon monoxide, methane, ammonia, carbon dioxide, and mixtures thereof. In certain embodiments, the reducing atmosphere is an argon-hydrogen mixture, a nitrogen-hydrogen mixture, or a sulfur-hydrogen mixture. In some embodiments, where the reducing atmosphere is an argon-hydrogen mix, the amount of hydrogen in the mixture is between 0.1-50 v/v % (i.e., volume hydrogen/total volume), between 1-25 v/v %, or between 4-10 v/v %. In other embodiments, where the reducing atmosphere is an nitrogen-hydrogen mix, the amount of hydrogen in the mixture is between 0.1-50 v/v %, between 1-25 v/v %, or between 4-10 v/v %.

In other embodiments, the composition is doped with a compound having an aliovalent element. In some embodiments, the aliovalent-doping element is selected from the group consisting of: alkali metals, alkaline earth metals, transition metals, lanthanides, actinides, post-transition metals, metalloids, and non-metals. In certain embodiments, the composition is doped with chromium, manganese, cobalt, iron, copper, zinc, nitrogen, and combinations thereof. In other embodiments, the composition is doped with chromium, manganese, cobalt, iron, copper, zinc, nitrogen, yttrium, magnesium, lanthanum, and combinations thereof. In one particular embodiment, the composition is doped with nitrogen. In another embodiment, the composition is doped with chromium. In such an embodiment, the aliovalent-doping element may be $Cr^{3+}$, and the compound having the aliovalent-doping element may be $Cr(NO_3)_3$. In another embodiment, the composition is doped with cobalt. In such an embodiment, the aliovalent-doping element may be $Co^{2+}$, and the compound having the aliovalent-doping element may be $Co(NO_3)_2$. In another embodiment, the composition is doped with manganese. In such an embodiment, the aliovalent-doping element may be $Mn^{2+}$, and the compound having the aliovalent-doping element may be $Mn(CH_3COO)_2$.

In other embodiments, the composition is first doped with chromium, cobalt, or manganese, and then post-annealed/doped with nitrogen. In certain embodiments, the mesoporous metal oxide microsphere composition comprises between 0.01-20 mol. % of the doping element, between 0.1-10 mol. % of the doping element, or between 1-5 mol. % of the doping element. In some embodiments, the amount of the doping element in the composition is approximately 2 mol. %. In other embodiments, the amount of the doping element in the composition is approximately 5 mol. %.

In yet other embodiments, the surface of the mesoporous metal oxide microsphere composition may be coated with a coating composition to improve the conductivity and resulting rate capability/cycling performance. In some embodiments, the surface may be coated with a coating composition selected from the group consisting of: nitrides, oxides, carbides, halides, borides, phosphides, and combinations thereof.

In some embodiments, the surface of the mesoporous metal oxide microsphere composition is coated with a carbon composition. The carbon coating composition may be doped with a non-metal or metalloid element. In one particular embodiment, the metal oxide is coated with a nitrogen-doped carbon composition. The source of the nitrogen doping element in the nitrogen-doped carbon coating composition may be by annealing cathodes in flowing ammonia or nitrogen gas or by coating organic amines. In particular, the source of the nitrogen doping element in the nitrogen-doped carbon coating composition may include pyridine, 1-ethyl-3-methylimidazolium bis(trifluoromethanesulfonyl) imide (EMIm-TFSI), 1-ethyl-3-methylimidazolium dicyanamide (EMIm-DCA), and mixtures thereof.

Non-limiting examples for the source of the nitrogen doping element in the nitrogen-doped carbon coating composition include pyridine, 1-ethyl-3-methylimidazolium bis(trifluoromethanesulfonyl) imide (EMIm-TFSI), 1-ethyl-3-methylimidazolium dicyanamide (EMIm-DCA), and mixtures thereof.

In certain embodiments, the coated mesoporous metal oxide microsphere composition comprises between 0.1-20 wt. % carbon, between 1-10 wt. % carbon, or between 4-8 wt. % carbon. Additionally, the coated mesoporous metal oxide microsphere composition may comprise between 0.01-10 wt. %, 0.05-5 wt. %, or 0.1-1 wt. % of the doping element (e.g., nitrogen, chromium).

In certain embodiments, the mesoporous metal oxide microsphere composition is treated by more than one method. In some embodiments, the composition is treated by annealing and doping; annealing and coating; doping and coating; or annealing, doping, and coating. In one specific embodiment, the composition is doped with nitrogen and annealed. In another embodiment, the composition is doped with chromium and annealed. In yet another embodiment, the composition is doped with nitrogen and chromium and annealed.

In one embodiment, the mesoporous metal oxide microsphere composition is a $TiO_2$ anatase microsphere composition, wherein the composition has been treated by doping the titanium oxide with chromium (in certain embodiments at 2 mol. % or 5 mol. %). In another embodiment, the $TiO_2$ anatase is doped with nitrogen. In yet another embodiment, the $TiO_2$ anatase is doped with both chromium and nitrogen. In another embodiment, the $TiO_2$ anatase is doped with chromium and annealed.

Cathode

In certain embodiments, the cathode comprises a material capable of intercalating the metal ions during a discharge cycle and deintercalating the metal ions during a charge cycle. In certain embodiments, the cathode is a "high-rate" or "high current rate" cathode capable of a fast charge and discharge capacity.

In certain embodiments, the cathode comprises an active material selected from the group consisting of one or more phases: $LiCoO_2$, $LiMn_2O_4$, $Li_2MnO_3$, $LiNiO_2$, $LiMn_{1.5}Ni_{0.5}O_4$, $LiFePO_4$, $Li_2FePO_4F$, $Li_3CoNiMnO_6$, and $Li(Li_aNi_xMn_yCo_z)O_2$. In one particular embodiment, the cathode comprises $LiFePO_4$.

In other embodiments, the cathode is selected from the group consisting of: $\lambda$-$MnO_2$ (or $\lambda$-$Mn_2O_4$) and $V_2O_5$. In some embodiments, the cathode is "$LiM_xO_y$" [herein defined as a cathode material comprising at least one metal (M) and oxide (O)]. Non-limiting examples of $LiM_xO_y$ cathodes include lithium cobalt oxide, lithium iron phosphate, and lithium manganese oxide.

In certain embodiments, the cathode is $Li_aMn_{1.5-b}Ni_{0.5-c}M_dO_4$, wherein M comprises any metal element, including alkali metals, alkaline earth metals, transition metals, lanthanides, actinides, post-transition metals, or metalloids. In some embodiments, the metal element is added to the cathode material through a dopant compound. The dopant compound may be a metal oxide. In certain embodiments, the metal (M) in the cathode comprises an element selected from the group consisting of: Li, Na, K, Mg, Be, Ca, Sr, Ba, Si, Al, Ga, In, Tl, Sc, Ti, V, Cr, Fe, Pt, Os, Cu, or Zn.

In certain embodiments, these active components can be mixed with a carbon material (such as carbon black, for example) to make them conducting, and mixed with a binder (such as PVDF binder in N-methylpyrrolidinole, for example) to hold the material together.

In other non-limiting examples, Ti(II) and Mn(II) complexes may also be considered as a transition element for the cathode material.

In another embodiment, the cathode material is $\lambda$-$MnO_2$. In certain embodiments, the cathode material can be prepared in a "reduced" or uncharged state by reacting $MnO_2$ with butyllithium for Li-ion batteries. The cathode may then be "charged" by oxidation of the Mn oxide resulting in expulsion of $Li^+$ ions.

Spinel-type $MnO_2$ may be made by treating $LiMn_2O_4$ with aqueous acid. This $\lambda$-$MnO_2$ has the same structural framework of spinel, but with most of the lithium removed from the tetrahedral sites of the spinel lattice. The mechanism for the conversion of $LiMn_2O_4$ to $\lambda$-$MnO_2$ involves a disproportionation of the $Mn^{3+}$ ions into $Mn^{4+}$ (remains in the solid) and $Mn^{2+}$ (leaches out into the aqueous solution).

In some embodiments, the conductivity of the cathode composition may be improved by coating the surface of the cathode with a carbon-containing composition. The cathode may be coated with a non-metal or metalloid doped carbon composition. In some embodiments, the cathode is coated with a nitrogen-doped carbon composition. In one particular embodiment, the cathode comprises $LiFePO_4$ and a nitrogen-doped carbon coating composition. Non-limiting examples for the source of the nitrogen doping element in the nitrogen-doped carbon coating composition include pyridine, 1-ethyl-3-methylimidazolium bis(trifluoromethanesulfonyl) imide (EMIm-TFSI), 1-ethyl-3-methylimidazolium dicyanamide (EMIm-DCA), and mixtures thereof. In certain embodiments, the coated cathode comprises between 0.1-20 wt. carbon, between 1-10 wt. % carbon, or between 4-8 wt. % carbon. Additionally, the coated cathode may comprise between 0.01-10 wt. %, 0.05-5 wt. %, or 0.1-1 wt. % of the doping element (e.g., nitrogen, chromium).

In other embodiments, the cathode properties (e.g., conductivity, capacity retention) may be improved by chemically modifying the cathode through an annealing reaction. The annealing reaction may be conducted in a reducing atmosphere to at least partially reduce the metal in the cathode. For example, the reducing atmosphere may include a vacuum or flowing reducing gas to at least partially reduce the metal in the composition. In certain embodiments, the reducing atmosphere is an inert gas. In some embodiments, the reducing atmosphere is a vacuum. In other embodiments, the reducing atmosphere contains a gas selected from the group consisting of: hydrogen, argon, nitrogen, fluorine, sulfur, carbon monoxide, methane, ammonia, carbon dioxide, and mixtures thereof. In one particular embodiment, the annealing reaction is conducted in flowing ammonia gas (i.e., the cathode composition is subjected to a nitridation reaction). In some embodiments, the annealing reaction is carried out at a temperature between 300-800° C., 500-700° C., or 550° C. for a time between 30 minutes and 24 hours, or between 1-15 hours, with a reducing gas (e.g., ammonia) flow rate of approximately 1 mL/min-500 mL/min or about 200 mL/min for 0.5-2 g of cathode material.

In one particular embodiment, the cathode is a $LiMn_{1.5}Ni_{0.5}O_4$ or a doped metal cathode ($Li_aMn_{1.5-b}Ni_{0.5-c}M_dO_4$) (spinel), and is annealed in a flowing ammonia gas atmosphere. Such uniformly dispersed oxy-nitride, metal nitride, or dissolved/adsorbed nitrogen on active $Li_aMn_{1.5-b}Ni_{0.5-c}M_dO_4$ (spinel) cathode material can provide a high capacity retention, continuous chemical stability, tolerance of manganese dissolution at high temperature, improved electron conductivity, and/or reduced irreversible capacity loss. Controlled surface of the active material may have a low resistance and enhance the surface intercalation reaction of a lithium ion, reduce cell polarization, and/or inter-particle resistance and contact between active electrode material and electrolyte. Furthermore, an annealed spinel material may offer a viable, low-cost approach with a power density value much higher than that of the other cathode materials, such as $LiCoO_2$, $LiMn_2O_4$, and $LiFePO_4$. In certain embodiments, the annealed spinel cathodes may have a capacity exceeding 120 mAh/g or 130 mAh/g at various discharge rates, such as C/10, 1 C, 3 C, 5 C, and 10 C.

Electrolyte

Suitable electrolytes for the battery are electrochemically stable compositions within the operation window of the electrodes. In other words, in certain embodiments, a suitable electrolyte is one that is capable of supporting reversible deposition and stripping of metal at the anode, and reversible intercalation and deintercalation of metal at the cathode. Suitable electrolytes may include materials that assist in achieving a wide electrochemical window, good ionic conductivity, improved rate capability, long cycle ability, good capacity retention, and compatibility with the anode and cathode materials.

In certain embodiments, the electrolyte is a metal salt. The metal salt may be dissolved in an organic solvent such as ethylene carbonate, dimethyl carbonate, diethyl carbonate, and combinations thereof. In some embodiments, the battery is a lithium-ion battery and the electrolyte is a lithium salt selected from the group consisting of: $LiPF_6$, $LiBF_4$, and $LiClO_4$.

In certain embodiments, the electrolyte materials may be optimized through the addition of suitable co-solvents that may assist in reducing viscosity (increasing mobility) and/or increasing charge transfer number (increasing salt dissociation).

Performance

In certain embodiments, the treated mesoporous metal oxide microsphere electrode (e.g., Cr—N codoped $TiO_2$ anatase) has a higher capacity in comparison to a similar non-treated mesoporous metal oxide electrode. For example, a treated mesoporous metal oxide microsphere electrode may have an electrical conductivity of at least $1\times10^{-7}$ S/cm, $2\times10^{-7}$ S/cm, $3\times10^{-7}$ S/cm or $4\times10^{-7}$ S/cm at 25° C. and 60 MPa, 80 MPa, or 100 MPa. In some embodiments, the treated mesoporous metal oxide microsphere electrode may have an electrical conductivity of at least 10%, 50%, 100%, 250%, 333%, or 500% higher conductivity in comparison to a similar non-treated mesoporous metal oxide microsphere electrode. In certain embodiments, a Cr—N doped or N-doped mesoporous $TiO_2$ anatase microsphere composition has at least a 250%, 333%, or 500% improved conductivity over a similar non-treated mesoporous $TiO_2$ anatase microsphere composition.

In some embodiments, treated mesoporous metal oxide microsphere electrode (e.g., Cr—N codoped $TiO_2$ anatase) is in a battery that has at least a 25% higher capacity (mAh/g) at a rate of C/10, at least a 75% higher capacity at a rate of 1 C, and/or at least a 300% higher capacity at a rate of 10 C, in comparison with a similar battery having a mesoporous metal oxide metal oxide microsphere that has not been treated, at the same cycle number. In one particular embodiment, the treated mesoporous $TiO_2$ anatase anode microsphere electrode is in a lithium-ion battery and has at least a 26% higher capacity at a rate of C/10, at least a 78% higher capacity at a rate of 1 C, or at least a 320% higher capacity at a rate of 10 C, when compared with a lithium-ion battery having a pure $TiO_2$ anatase anode composition. In another embodiment, a Cr—N codoped mesoporous $TiO_2$ anatase anode microsphere electrode is in a lithium-ion battery and has at least a 15% higher capacity at a rate of C/10, at least a 20% higher capacity at a rate of 1 C, or at least a 50% higher capacity at a rate of 10 C, when compared with a lithium-ion battery having a N-doped $TiO_2$ anatase anode composition.

In other embodiments, the treated mesoporous metal oxide microsphere electrodes (e.g., Cr—N codoped $TiO_2$ anatase) have a capacity (rate performance) of at least 240 mAh/g at a rate of C/10, a capacity of at least 200 mAh/g at a rate of 1 C, and/or a capacity of at least 125 mAh/g at a rate of 10 C.

Additionally, in some embodiments, the treated mesoporous metal oxide microsphere electrodes (e.g., N doped $TiO_2$ anatase) have a capacity of at least 220 mAh/g at a rate of C/10, a capacity of at least 170 mAh/g at a rate of 1 C, and/or a capacity of at least 85 mAh/g at a rate of 10 C.

In comparison, in some embodiments, the capacity of the battery comprising a non-treated mesoporous metal oxide microsphere electrode may be approximately 190 mAh/g at 0.1 C, a capacity of at least 115 mAh/g at a rate of 1 C, and approximately 30 mAh/g at 10 C.

In certain embodiments, the electrode coated with a doped carbon composition has an improved capacity over an uncoated electrode or undoped carbon coated electrode. In some embodiments, the doped carbon coated electrode has at least a 10% improved capacity at 3 C, or at least a 30% improved capacity at 5 C. In one particular embodiment, a nitrogen doped carbon coated $LiFePO_4$ cathode has a capacity of approximately 125 mAh/g at C/10, 120 mAh/g at 1 C, 110 mAh/g at 3 C, or 98 mAh/g at 5 C.

In certain embodiments, a cathode that has undergone an annealing reaction has an improved capacity over an unreacted cathode. In some embodiments, the annealed cathode has a capacity of at least 120 mAh/g or 130 mAh/g at C/10, 1 C, 3 C, 5 C, or 10 C. In some embodiments, the annealed cathode has at least a 125% or 150% improved capacity over a similar, untreated cathode at 3 C, 5 C, or 10 C. In one particular embodiment, an annealed $LiMn_{1.5}Ni_{0.5}O_4$ spinel cathode has at least a 125% or 150% improved capacity over a similar, untreated $LiMn_{1.5}Ni_{0.5}O_4$ spinel cathode at 3 C, 5 C, or 10 C.

In certain embodiments, the battery comprising the treated mesoporous metal oxide microsphere electrode (e.g., Cr—N codoped $TiO_2$ anatase), has an improved charge and discharge rates. In some embodiments, the battery can discharge 50% of the full range capacity in approximately 6 minutes. In other embodiments, the battery can be charged from 0% to at least 50% of the full range capacity in 6 minutes. In one embodiment, a battery with a Cr—N codoped mesoporous $TiO_2$ anatase microsphere electrode can be charged from 0% to 52% of the full range capacity in 6 minutes.

In certain embodiments, the battery is a secondary battery capable of having at least 100, 1000, 5000, or 10000 cycles prior to battery failure. In some embodiments, battery failure is related to the functional discharge capacity becoming only 50%, 60%, 70%, 80%, or 90% of the initial discharge capacity after a number of cycles. In other embodiments, battery failure is related to the inability to recharge the battery due to dendrite formation, oxide film formation, or other buildup on the anode or cathode. In one particular embodiment, the battery is capable of having a functional discharge capacity greater than 90% of the initial discharge capacity after 100 cycles.

In certain embodiments, the battery comprising the treated (e.g., codoped) mesoporous metal oxide microsphere electrode is safer than similar batteries comprising carbon/graphite electrodes. Graphite anodes may have several drawbacks where safety is critical. This includes first cycle capacity loss. Since the carbon potential is close to that of $Li/Li^+$ redox level, lithium plating occurs on the carbon anode through a thin passivating Solid-Electrolyte Interphase (SEI) layer and lithium dendrite formation causes safety concerns. Since the redox level is away from the $Li/Li^+$ redox levels for certain oxides such as $TiO_2$ or Lithium titanate ($Li_4Ti_5O_{12}$), the SEI formation is prevented (and no Lithium plating/deposition), which leads to safer batteries. Additionally, compared to an alternate commercial lithium titanate ($Li_4Ti_5O_{12}$) anode material, codoped $TiO_2$ boasts a higher capacity in certain embodiments (e.g., approximately 240 mAh/g vs. 165 mAh/g).

Methods of Making

In certain embodiments, methods of making the battery comprise providing an anode comprising a mesoporous metal oxide microsphere composition. In certain embodiments, the methods further comprise providing a high-rate capable cathode. In certain embodiments, the methods further comprise providing an electrolyte capable of supporting reversible deposition and stripping of metal at the anode, and reversible intercalation and deintercalation of the metal at the cathode. In some embodiments, the anode comprises a mesoporous $TiO_2$ anatase microsphere composition. In some embodiments, the anode comprises a mesoporous $TiO_2$—B microsphere composition.

The mesoporous titanium oxide microsphere anatase composition may be formed by a hydrothermal reaction without the use of surfactants. The method may comprise dissolving urea $((NH_2)_2CO)$ in deionized water and ethanol under mild stirring. Titanium trichloride in 20% hydrochloric acid may then be added to the solution and stirred for between 1 hour and 24 hours, forming a mixed solution.

The mesoporous microsphere formation process may further comprise heating the mixed solution at an elevated temperature (i.e., greater than 25° C.) for a period of time between 1 and 72 hours, therein forming a slurry. In some embodiments, the mixed solution is heated to at least 100° C., and held at temperature for 24 hours. In one particular embodiment, the mixed solution is heated to 180° C. (at a rate of approximately 1-2° C./min) and held at temperature for 24 hours. The pressure of the reactor could be controlled from about 10-20 atm by mixing different ratio of $H_2O$ and ethanol. The pH of the solution could be controlled by the ammonia produced from urea decomposition, and by the rate of hydrolysis of the $TiCl_3$.

The mesoporous microsphere formation process may further comprise filtering and washing the slurry with deionized water, and drying the slurry in a vacuum oven at 100° C. The process may also comprise heating the dried slurry at elevated temperature (in some embodiments, 100° C., 250° C., or 500° C.) in air for at least 1 hour, 2 hours, or 5 hours to obtain a crystalline, high surface area mesoporous $TiO_2$ anatase microsphere powder.

In an alternative embodiment, the mesoporous microsphere composition for the anode is formed by providing colloidal silica and the metal oxide. The method may further comprise mixing the silica and metal oxide. The method may further comprise nebulizing the mixed solution into small droplets with an ultrasonic atomizer. The method may further comprise heating the nebulized mixed solution at an elevated temperature (e.g., 600° C.) and then collecting the composite powders in a water bubbling system. The method may further comprise refluxing the powders in a basic solution (e.g., sodium hydroxide solution) in order to etch the silica and sodium ions into the metal oxide structure. The method may further comprise washing the etched powder with an acid (e.g., hydrochloride acid) to remove the silicate residue from the pores and exchange the sodium ions with protons. The method may further comprise heat-treating the hydrated metal oxide at an elevated temperature (e.g., 400-500° C.) in flowing argon gas to form the mesoporous metal oxide microsphere structure. This method may be used to form a mesoporous $TiO_2$—B microsphere structure (as described in the example section below).

In certain embodiments, the mesoporous metal oxide microsphere composition (in some instances, a $TiO_2$ anatase or $TiO_2$—B composition) is annealed in a reducing atmosphere to at least partially reduce the metal (e.g., titanium) in the composition.

The reducing atmosphere may include a vacuum or flowing reducing gas to at least partially reduce the metal (e.g., titanium) in the composition. In certain embodiments, the reducing atmosphere is an inert gas. In some embodiments, the reducing atmosphere is a vacuum. In other embodiments, the reducing atmosphere contains a gas selected from the group consisting of: hydrogen, argon-hydrogen, nitrogen-hydrogen, fluorine, sulfur, hydrogen-sulfur, carbon monoxide, methane, ammonia, and carbon dioxide. In some embodiments, where the reducing atmosphere is an argon-hydrogen mix, the amount of hydrogen in the mixture is between 0.1-50 at v/v %, between 1-25 at v/v %, or between 4-10 v/v %. In other embodiments, where the reducing atmosphere is an nitrogen-hydrogen mix, the amount of hydrogen in the mixture is between 0.1-50 at v/v %, between 1-25 at v/v %, or between 4-10 at v/v %.

In other embodiments, the mesoporous metal oxide microsphere composition is doped with a compound having an aliovalent-doping element. In some embodiments, the aliovalent-doping element is selected from the group consisting of: alkali metals, alkaline earth metals, transition metals, lanthanides, actinides, post-transition metals, metalloids, and non-metals. In one particular embodiment, the mesoporous metal oxide microsphere composition is doped with nitrogen. In another embodiment, the composition is doped with chromium. In other embodiments, the composition is doped with aluminum, yttrium, or lanthanum. In certain embodiments, the mesoporous metal oxide microsphere composition comprises between 0.01-20 mol. % of the doping element, between 0.1-10 mol. % of the doping element, or between 1-5 mol. % of the doping element. In some embodiments, the amount of the doping element in the composition is approximately 2 mol. %. In other embodiments, the amount of the doping element in the composition is approximately 5 mol. %.

In certain embodiments, the metal oxide is a $TiO_2$ anatase polymorph, and the composition is doped with chromium (in some embodiments at 2 mol. % or 5 mol. %). In another embodiment, the $TiO_2$ anatase polymorph is doped with nitrogen. In yet another embodiment, the $TiO_2$ anatase polymorph is doped with both chromium (e.g., at 2 mol. % or 5 mol. %) and nitrogen.

The doping process may be conducted by mixing or stirring the compound having the aliovalent-doping element with or during the mesoporous metal oxide microsphere composition, as described above, for a period of time between 1 and 24 hours, therein forming a mixed solution. In some embodiments, the aliovalent-doping element is $Cr^{3+}$, or the compound having the aliovalent-doping element is $Cr(NO_3)_3$. In another embodiment, the aliovalent-doping element is $Co^{2+}$, or the compound having the aliovalent-doping element is $Co(NO_3)_2$. In yet another embodiment, the aliovalent-doping element is $Mn^{2+}$, or the compound having the aliovalent-doping element is $Mn(CH_3COO)_2$.

The doping process may further comprise heating the mixed solution of the doping element and mesoporous metal oxide microsphere composition at an elevated temperature (i.e., greater than 25° C.) for a period of time between 1 and 72 hours, therein forming a slurry. In some embodiments, the mixed solution is heated to at least 100° C., and held at temperature for 24 hours. In one particular embodiment, the mixed solution is heated to 180° C. (at a rate of about 1-2° C./min) and held at temperature for 24 hours.

The doping process may further comprise filtering and washing the slurry with deionized water, and drying the slurry in a vacuum oven at 100° C. The doping process may also comprise heating the dried slurry at elevated temperature (in some embodiments, 100° C., 250° C., or 500° C.) in air for at least 1 hour, 2 hours, or 5 hours to obtain a crystalline, high surface area metal oxide powder.

In another embodiment, the metal oxide may be doped with nitrogen. The nitrogen doping process may be conducted through an ammonolysis reaction. In certain embodiments, the metal oxide is treated with $NH_3$ gas at 550° C., with a $NH_3$ flow rate of 100 mL/min for at least 10 hours or 15 hours.

In yet other embodiments, the surface of the mesoporous metal oxide microsphere composition may be coated with a coating composition to improve the conductivity and resulting rate capability/cycling performance. In some embodiments, the surface may be coated with a coating composition selected from the group consisting of: nitrides, oxides, carbides, halides, borides, phosphides, and combinations thereof.

In certain embodiments, the surface of the metal oxide composition may be coated with a carbon-containing composition. The carbon coating may comprise a non-metal or metalloid doped carbon composition. In some embodiments, the metal oxide is coated with a nitrogen-doped carbon composition. Non-limiting examples for the source of the nitrogen doping element in the nitrogen-doped carbon coating composition include pyridine, 1-ethyl-3-methylimidazolium bis(trifluoromethanesulfonyl) imide (EMIm-TFSI), 1-ethyl-3-methylimidazolium dicyanamide (EMIm-DCA), and mixtures thereof. The coating step may be conducted through a hydrothermal process followed by post-annealing in the presence of an ionic liquid. For example, 1-ethyl-3-methylimidazolium bis(trifluoromethanesulfonyl) imide (EMIm-TFSI) can be mixed with the mesoporous metal oxide microsphere composition and heated at an elevated temperature in a flowing inert gas atmosphere. In certain embodiments, the mixture may be heated to at least 300° C., at least 500° C., or at least 700° C. The inert gas atmosphere may be a noble gas, such as argon. The time held at the elevated temperature may be at least 30 minutes, at least 60 minutes, or at least 90 minutes. In one particular embodiment, the coating step involves mixing 1-ethyl-3-methylimidazolium bis(trifluoromethanesulfonyl) imide (EMIm-TFSI) with mesoporous $TiO_2$ anatase microspheres and heating the mixture to 700° C. in a flowing argon atmosphere for 90 min.

In certain embodiments, the coating over the surface of the mesoporous microsphere composition is between 1-100 nm, 5-50 nm, or 10-15 nm in thickness. The coated mesoporous microsphere composition may comprise between 0.1-20 wt. % carbon, between 1-10 wt. % carbon, or between 4-8 wt. % carbon. Additionally, the coated mesoporous microsphere composition may comprise between 0.01-10 wt. %, 0.05-5 wt. %, or 0.1-1 wt. % of the doping element (e.g., nitrogen, chromium).

In certain embodiments, the mesoporous metal oxide microsphere composition is treated by more than one method. In some embodiments, the composition is treated by annealing and doping; annealing and coating; doping and coating; or annealing, doping, and coating. In one specific embodiment, the composition is doped with nitrogen and annealed. In another embodiment, the composition is doped with chromium and annealed. In yet another embodiment, the composition is doped with nitrogen and chromium and annealed. In one particular embodiment, the metal oxide is a $TiO_2$ anatase polymorph, and is doped with chromium and annealed.

In other embodiments, the surface of the cathode (e.g., $LiFePO_4$) may be coated with a doped carbon composition, such as a non-metal or metalloid doped carbon composition. In some embodiments, the cathode is coated with a nitrogen-doped carbon composition. In one particular embodiment, the cathode comprises $LiFePO_4$ and a nitrogen-doped carbon coating composition. Non-limiting examples for the source of the nitrogen doping element in the nitrogen-doped carbon coating composition include pyridine, 1-ethyl-3-methylimidazolium bis(trifluoromethanesulfonyl) imide (EMIm-TFSI), 1-ethyl-3-methylimidazolium dicyanamide (EMIm-DCA), and mixtures thereof. The coating step may be conducted through a hydrothermal process followed by post-annealing in the presence of an ionic liquid. For example, 1-ethyl-3-methylimidazolium bis(trifluoromethanesulfonyl) imide (EMIm-TFSI) can be mixed with an cathode (e.g., LiFePO$_4$) powder and heated at an elevated temperature in a flowing inert gas atmosphere. In certain embodiments, the mixture may be heated to at least 300° C., at least 500° C., or at least 700° C. The inert gas atmosphere may be a noble gas, such as argon. The time held at the elevated temperature may be at least 30 minutes, at least 60 minutes, or at least 90 minutes. In one particular embodiment, the coating step involves mixing 1-ethyl-3-methyl-imidazolium bis(trifluoromethanesulfonyl) imide (EMIm-TFSI) with LiFePO$_4$ powder and heating the mixture to 700° C. in a flowing argon atmosphere for 90 min.

In certain embodiments, the coating over the surface of the cathode is between 1-100 nm, 5-50 nm, or 10-15 nm in thickness. The coated cathode composition may comprise between 0.1-20 wt. % carbon, between 1-10 wt. % carbon, or between 4-8 wt. % carbon. Additionally, the coated cathode composition may comprise between 0.01-10 wt. %, 0.05-5 wt. %, or 0.1-1 wt. % of the doping element (e.g., nitrogen, chromium).

In some embodiments, batteries for grid storage applications may be formed using the improved electrode compositions described. In other embodiments, batteries for vehicle applications may be formed. In yet other embodiments, batteries for military applications may be formed. In yet other embodiments, batteries for portable electronic devices may be formed. In some embodiments, batteries for medical device applications may be formed. In certain embodiments, batteries for standard cell size battery applications may be formed.

While the invention as described may have modifications and alternative forms, various embodiments thereof have been described in detail. It should be understood, however, that the description herein of these various embodiments is not intended to limit the invention, but on the contrary, the intention is to cover all modifications, equivalents, and alternatives falling within the spirit and scope of the invention as defined by the claims. Further, while the invention will also be described with reference to the following non-limiting examples, it will be understood, of course, that the invention is not limited thereto since modifications may be made by those skilled in the art, particularly in light of the foregoing teachings.

EXAMPLES

Various mesoporous TiO$_2$ microspheres (treated and non-treated) were formed and tested in lithium-ion batteries for their performance characteristics. Additionally, nitrogen-doped carbon coated cathodes were formed and tested as well. While not described below, additional mesoporous metal oxide microspheres may be considered for treating/doping to improve the performance characteristics of the electrode composition. For example, in addition to mesoporous TiO$_2$ anatase microspheres, mesoporous TiO$_2$—B microspheres may be considered for treating.

Example 1

Mesoporous TiO$_2$—B Material Synthesis

A titania-silica composite precursor was prepared by a template assisted ultrasonic spray pyrolysis method. Colloidal silica (30 g, 30 wt. % LUDOX HS-30, Aldrich) was added into titanium (IV) bis(ammonium lactato)dihydroxide solution (200 mL, 0.25 M, Aldrich) under stirring. The mixed solution was nebulized into small droplets by an ultrasonic atomizer (2.4 MHz, Sonaer Ultrasonics). Flowing nitrogen gas carried the droplets through a tube furnace at 600° C. The titania-silica composite powders were then collected in a water bubbling system. The powders were then refluxed in sodium hydroxide solution (100 ml, 8 M, Aldrich) at 100° C. for 3 days, in hydrochloride acid (1 M) to remove silicate residue from the pores and exchange sodium ions with protons. The hydrated sample (H$_2$Ti$_2$O$_5$.H$_2$O) was then heat-treated at a temperature between 400° C. and 500° C. in a flowing argon gas for an hour to form H$_2$Ti$_3$O$_7$ and TiO$_2$—B, respectively.

It is noted, that in other embodiments, the mesoporous TiO$_2$—B may be synthesized without the use of silica as the template.

Example 2

Mesoporous TiO$_2$ Anatase Material Synthesis

Mesoporous TiO$_2$ spheres were obtained by hydrothermal reaction without the use of surfactants. In a typical experiment, 25 mmol of urea ((NH$_2$)$_2$CO, Alfa >98.5) were dissolved in 1.5 mL of deionized water (DI water) and 8.5 mL of ethanol under mild stirring. Titanium trichloride (5 mmol; TiCl$_3$ in 20% HCl, Alfa) was then added to this solution and stirred for 12 h. During the mixing, the color of the transparent solution changed from purple to colorless. The solution was transferred into a 100-mL Teflon-lined autoclave and heated at 180° C. for 24 h with a heating/cooling rate of 1° C./min. The pH ($\geq$10) of the reaction medium was controlled by ammonia produced from urea decomposition, and by the rate of hydrolysis of TiCl$_3$. The resultant slurry was filtered and washed with DI water, and then dried in a vacuum oven at 100° C. The powder was finally heated at 500° C. in air for 5 h to obtain a crystalline, high surface area TiO$_2$ powder.

Example 3

Cr Doped TiO$_2$ (2 Mol. % Cr)

2% Cr-doped mesoporous TiO$_2$ spheres were obtained by hydrothermal reaction without the use of surfactants. In a typical experiment, 25 mmol of urea ((NH$_2$)$_2$CO, Alfa) were dissolved in 1.5 mL of deionized water (DI water) and 8.5 mL of ethanol under mild stirring. Titanium trichloride (5 mmol; TiCl$_3$ in 20% HCl, Alfa) with 0.102 mmol Cr(NO$_3$)$_3$ was then added to this solution and stirred for 12 h. During the mixing, the color of the transparent solution changed from purple to colorless. The solution was transferred into a 100 mL Teflon-lined autoclave and heated at 180° C. for 24 h with a heating/cooling rate of 1° C./min. The pH ($\geq$10) of the reaction medium was controlled by ammonia produced from urea decomposition, and by the rate of hydrolysis of TiCl$_3$. The resultant slurry was filtered and washed with DI water, and then dried in a vacuum oven at 100° C. The powder was finally heated at 500° C. in air for 5 h to obtain a crystalline, high surface area TiO$_2$ powder.

Example 4

Cr Doped TiO$_2$ (5 Mol. % Cr)

5% Cr-doped mesoporous TiO$_2$ spheres were obtained by hydrothermal reaction without the use of surfactants. In a typical experiment, 25 mmol of urea ((NH$_2$)$_2$CO, Alfa) were dissolved in 1.5 mL of deionized water (DI water) and 8.5 mL of ethanol under mild stirring. Titanium trichloride (5 mmol; TiCl₃ in 20% HCl, Alfa) with 0.263 mmol Cr(NO₃)₃ was then added to this solution and stirred for 12 h. During the mixing, the color of the transparent solution changed from purple to colorless. The solution was transferred into a Teflon-lined autoclave and heated at 180° C. for 24 h with a heating/cooling rate of 1° C./min. The pH (≥10) of the reaction medium was controlled by ammonia produced from urea decomposition, and by the rate of hydrolysis of TiCl₃. The resultant slurry was filtered and washed with DI water, and then dried in a vacuum oven at 100° C. The powder was finally heated at 500° C. in air for 5 h to obtain a crystalline, high surface area TiO₂ powder.

Example 5

Mn Doped TiO₂ (2.5 Mol. % Mn)

2.5% Mn-doped mesoporous TiO₂ spheres were obtained by hydrothermal reaction without the use of surfactants. In a typical experiment, 25 mmol of urea ((NH₂)₂CO, Alfa) were dissolved in 1.5 mL of deionized water (DI water) and 8.5 mL of ethanol under mild stirring. Titanium trichloride (5 mmol; TiCl₃ in 20% HCl, Alfa) with 0.128 mmol Mn(CH₃COO)₂ was then added to this solution and stirred for 12 h. The solution was transferred into a 100 mL Teflon-lined autoclave and heated at 180° C. for 24 h with a heating/cooling rate of 1° C./min. The pH (≥10) of the reaction medium was controlled by ammonia produced from urea decomposition, and by the rate of hydrolysis of TiCl₃. The resultant slurry was filtered and washed with DI water, and then dried in a vacuum oven at 100° C. The powder was finally heated at 500° C. in air for 5 h to obtain a crystalline, high surface area TiO₂ powder.

Example 6

Co Doped TiO₂ (2.5 Mol. % Co)

2.5% Co-doped mesoporous TiO₂ spheres were obtained by hydrothermal reaction without the use of surfactants. In a typical experiment, 25 mmol of urea ((NH₂)₂CO, Alfa) were dissolved in 1.5 mL of deionized water (DI water) and 8.5 mL of ethanol under mild stirring. Titanium trichloride (5 mmol; TiCl₃ in 20% HCl, Alfa) with 0.128 mmol Co(NO₃)₂ was then added to this solution and stirred for 12 h. The solution was transferred into a 100 mL Teflon-lined autoclave and heated at 180° C. for 24 h with a heating/cooling rate of 1° C./min. The pH (≥10) of the reaction medium was controlled by ammonia produced from urea decomposition, and by the rate of hydrolysis of TiCl₃. The resultant slurry was filtered and washed with DI water, and then dried in a vacuum oven at 100° C. The powder was finally heated at 500° C. in air for 5 h to obtain a crystalline, high surface area TiO₂ powder.

Example 7

N Doped TiO₂ (0 Mol. % Cr)

Nitrogen doped mesoporous TiO₂ spheres were obtained by using the as-synthesized TiO₂ mesoporous microspheres, described in Example 2, and treating the composition under NH₃ gas at 550° C. (ammonolysis), with a NH₃ flow rate of 100 mL/min for 10 h, and 15 h, respectively.

Example 8

Cr—N Doped TiO₂ (2 Mol. % Cr)

Chromium-nitrogen doped mesoporous TiO₂ spheres were obtained by using the as-synthesized chromium doped TiO₂ mesoporous microspheres, described in Example 3, and treating the composition under NH₃ gas at 550° C. (ammonolysis), with a NH₃ flow rate of 100 mL/min for 10 h, and 15 h.

Example 9

Cr—N Doped TiO₂ (5 Mol. % Cr)

Chromium-nitrogen doped mesoporous TiO₂ spheres were obtained by using the as-synthesized chromium doped TiO₂ mesoporous microspheres, described in Example 4, and treating the composition under NH₃ gas at 550° C. (ammonolysis), with a NH₃ flow rate of 100 mL/min for 10 h, and 15 h.

Example 10

Mn—N Doped TiO₂ (2.5 Mol. % Mn)

Manganese-nitrogen doped mesoporous TiO₂ spheres, obtained by using the as-synthesized manganese doped TiO₂ mesoporous microspheres described in Example 5, may be post-annealed in flowing ammonia gas conditions (by treating the composition under NH₃ gas at 550° C. with a NH₃ flow rate of 100 mL/min for 10 h or 15 h).

Example 11

Co—N Doped TiO₂ (2.5 Mol. % Co)

Cobalt-nitrogen doped mesoporous TiO₂ spheres, obtained by using the as-synthesized manganese doped TiO₂ mesoporous microspheres described in Example 6, may be post-annealed in flowing ammonia gas conditions (by treating the composition under NH₃ gas at 550° C. with a NH₃ flow rate of 100 mL/min for 10 h or 15 h).

Example 12

Annealed TiO₂

Annealed mesoporous TiO₂ spheres were obtained by using the as-synthesized TiO₂ mesoporous microspheres, described in Example 2, and treating the composition in air or mixture of argon and 4 v/v. % hydrogen gas 550° C., with a gas flow rate of 100 mL/min for 10 h, and 15 h, respectively.

Example 13

Nitrogen Doped Carbon Coated LiFePO₄ Electrode

Rod-like LiFePO₄ with a nitrogen-doped carbon layer was prepared by the following procedure. First, the rod-like LiFePO₄ powders were obtained by hydrothermal reaction. An aqueous solution of LiOH and glucose was first stirred for 1 h. An aqueous solution of the iron sulfate heptahydrate (FeSO₄·7H₂O, 99%, Alfa) and ammonium hydrogen phosphate ((NH₄)₂HPO₄, 99%, Alfa) was then added to this mixture so that the Li:Fe:P molar ratio was 2:1:1 and Fe²⁺ to glucose molar ratio was 2:1. 40 mL of the transparent solution obtained was transferred into a 100 mL Teflon-lined autoclave and heated at 220° C. for 24 h with a heating/cooling rate of 2° C./min. The resultant slurry was then filtered and washed with deionized water (DI water) before drying in a vacuum oven. Different amounts of 0.1 mL, 0.2 mL, and 0.3 mL 1-ethyl-3-methylimidazolium bis(trifluoromethanesulfonyl) imide (EMIm-TFSI) were mixed with 0.5 g of as-prepared rod-like LiFePO$_4$ powders (the obtained samples were named as Sample 1, Sample 2, and Sample 3), respectively. Samples 1, 2, and 3 were heated to 700° C. in flowing argon atmosphere for 90 min.

Example 14

Annealing/Nitridation of Li$_a$Mn$_{1.5-b}$Ni$_{0.5-c}$M$_d$O$_4$ Cathode

An annealed cathode is prepared by providing a cathode material comprising Li$_a$Mn$_{1.5-b}$Ni$_{0.5-c}$M$_d$O$_4$. The cathode material is then annealed under NH$_3$ gas at 550° C. (ammonolysis), with a NH$_3$ flow rate of 200 mL/min, for between 1 and 15 h. The annealing process results in forming a conducting nitradated cathode material.

Material Characterization:

Regarding the mesoporous metal oxide microsphere compositions, X-ray diffraction (XRD) patterns were collected on a Bruker D5005 diffractometer using Cu K a radiation. Nitrogen adsorption-desorption isotherms were obtained using a TriStar surface area & porosity analyzer at 77 K. The specific surface area was calculated by the Brunauer-Emmett-Teller (BET) method. The pore size distribution was calculated by the Barret-Joyner-Halenda (BJH) method. The microstructural characterizations of mesoporous TiO$_2$ were performed using a Hitachi HF-3300 S/TEM instrument that was operated at 300 kV. Electronic conductivities of the powders were measured by two electrodes under different pressures using a hydraulic press. Constant current was applied by Keithley multimeter 2602 and the voltage was recorded by a Keithley instruments Model 2000 instrument.

Regarding the coated LiFePO$_4$ electrodes, the compositions were characterized with a Scintag X-ray diffractometer with Cu Kα radiation, Perkin-Elmer series 7 Thermal Analysis System thermo-gravimetric analysis (TGA), Thermo X-ray photoelectron spectrometer (XPS), WITec Raman spectroscopy with a 512 nm laser excitation, Hitachi S-4800 FEG scanning electron microscope (SEM), Hitachi HF-3300 transmission electron microscope (TEM), and electrochemical charge-discharge measurements.

Electrochemical Evaluation:

Regarding the mesoporous microsphere anodes, the electrodes were fabricated by a conventional coating method. A slurry was made that consisted of 70 wt. % of the as-synthesized active material, 15 wt. % carbon black (e.g. Super-S or Super 45 carbon black), and 15 wt. % polyvinylidene fluoride (PVDF) dissolved in N-methyl-2-pyrrolidone (NMP). The metal oxide slurry composition comprising 2-3 mg/cm$^2$ of active material was uniformly spread onto a copper foil, and dried in a vacuum oven at 120° C. for approximately 12 hours before transferring into an Argon-filled glove box.

Regarding the doped coated cathodes, the electrodes were fabricated with a slurry consisting of 70 wt. % of the as-synthesized active material LiFePO$_4$ composition, 20 wt. % carbon black (e.g. Super-S or Super 45 carbon black), and 10 wt. % polyvinylidene fluoride (PVDF) dissolved in N-methyl-2-pyrrolidone (NMP). The electrodes were spread onto an aluminum foil and were dried in a vacuum oven at 120° C. for approximately 12 hours before transferring into an Argon-filled glove box.

Regarding the annealed cathodes (via nitridation), the electrodes were fabricated with a slurry consisting of 80 wt. % of the as-synthesized annealed cathode material was spread onto an aluminum foil, 10 wt. % carbon black (Super 45 carbon black), and 10 wt. % polyvinylidene fluoride (PVDF) dissolved in N-methyl-2-pyrrolidone (NMP). The electrodes were dried in a vacuum oven before transferring into an Argon-filled glove box.

Coin cells (CR2032) were fabricated using lithium metal as the counter electrode, Celgard 2325 as the separator, and LiPF$_6$ (1 M) in ethylene carbonate/dimethyl carbonate/diethyl carbonate (EC/DMC/DEC, 1:1:1 vol. %) or ethylene carbonate/diethyl carbonate (1:1 vol. %) as the electrolyte.

The cells could be tested using an Arbin BT2000 charger and a Princeton Applied Research VersaSTAT 4 potentiostat. Certain charge-discharge experiments were performed galvano-statically at a constant current density of 15.2 mA/g (C/10) of active material within the voltage range of 2 and 4.3 V vs. Li/Li$^+$, or between 3.5 and 5.0 V. Certain electrochemical impedance spectroscopic analyses (EIS) were carried out with a VersaSTAT 4 by applying a 10 mV amplitude signal in the frequency range of 10 kHz to 0.01 Hz.

Results:

FIG. 1 shows the electrical conductivity (in Siemens/centimeter or S/cm) versus pressure (megapascals or MPa) for TiO$_2$ anatase, nitrogen doped TiO$_2$ anatase, and nitrogen-chromium doped TiO$_2$ anatase compositions. According to FIG. 1, at 60 MPa, the electrical conductivity of a nitrogen doped mesoporous TiO$_2$ anatase microsphere composition was approximately 333% higher than a similar undoped TiO$_2$ composition. Additionally, at 60 MPa, the conductivity of a nitrogen-chromium doped mesoporous TiO$_2$ anatase microsphere composition was approximately 500% higher than a similar undoped TiO$_2$ composition. At 100 MPa, the electrical conductivity of a nitrogen doped mesoporous TiO$_2$ anatase microsphere composition was approximately 250% higher than a similar undoped TiO$_2$ composition. Further, at 100 MPa, the conductivity of a nitrogen-chromium doped mesoporous TiO$_2$ anatase microsphere composition was approximately 333% higher than a similar undoped TiO$_2$ composition.

Figure 2:
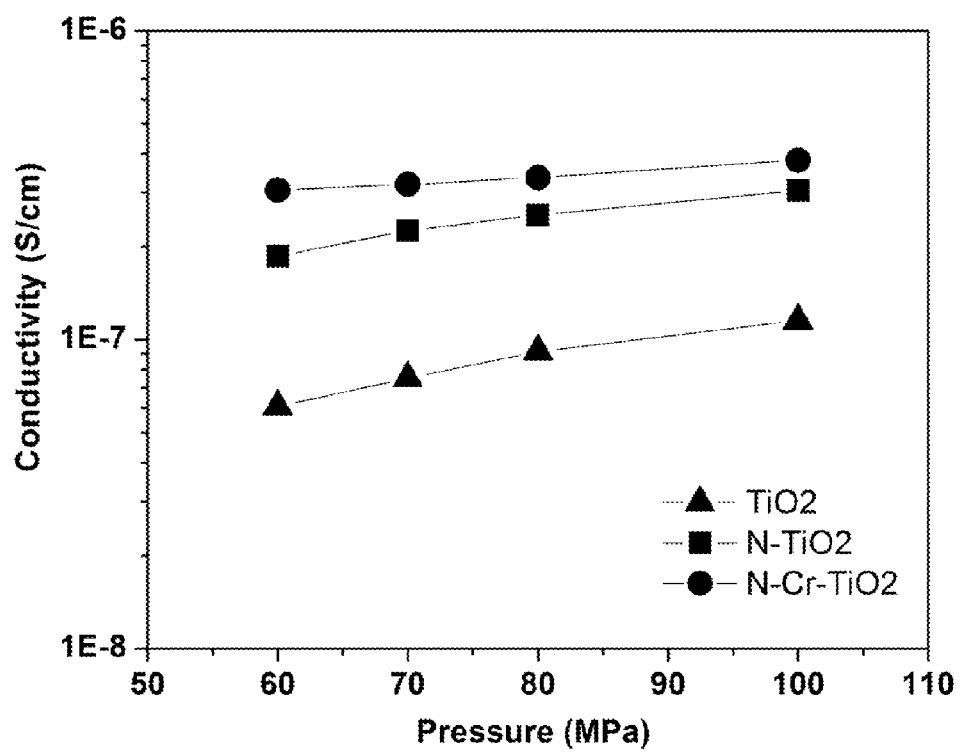
FIG. 2 depicts the conductivity (S/cm) at various pressures (MPa) for mesoporous titanium oxide anatase microparticle compositions, in comparison with nitrogen doped and nitrogen-chromium codoped mesoporous $TiO_2$ anatase microparticle compositions.

FIG. 2 shows the charge-discharge capacities of undoped/non-treated, nitrogen-doped, and nitrogen-chromium doped mesoporous TiO$_2$ microspheres at different current rates (C/10, C/2, 1 C, 2 C, 5 C, and 10 C). The results show that in the first cycle at low rate (C/10), nitrogen doped mesoporous TiO$_2$ microspheres can deliver a high initial discharge capacity of approximately 260 mAh/g that is equal to 77% of the theoretical capacity (335 mAh/g) and a charge capacity of approximately 221 mAh/g. The initial charge-discharge capacities of the nitrogen-chromium doped mesoporous TiO$_2$ microspheres are approximately 253 and 304 mAh/g, respectively. The initial charge-discharge capacities of the undoped/non-treated mesoporous TiO$_2$ microspheres are approximately 201 and 220 mAh/g, respectively. The initial efficiencies (initial charge capacity/initial discharge capacity*100%) of the, non-treated, nitrogen doped TiO$_2$ and nitrogen-chromium codoped TiO$_2$ are 90%, 85% and 83%, respectively. The higher capacity of mesoporous spheres implies that the nitrogen-chromium doped composition has an advantage of building up a better ionic and electronic conduction net in the electrode layer. The nitrogen-chromium codoped TiO$_2$ microspheres show rate performance with approximately 200 mAh/g at 1 C, approximately 153 mAh/g at 5 C, and approximately 127 mAh/g at 10 C, and the nitrogen doped $TiO_2$ microspheres show rate performances of approximately 172 mAh/g at 1 C, approximately 114 mAh/g at 5 C, and approximately 86 mAh/g at 10 C. The undoped/non-treated $TiO_2$ microspheres show rate performances of approximately 117 mAh/g at 1 C, approximately 56 mAh/g at 5 C, and approximately 30 mAh/g at 10 C. The mesoporous $TiO_2$ microspherical material can maintain large capacity even at high rates because of its characteristic pseudocapacitive behavior.

Figures 3A, 3B, 3C, 3D:
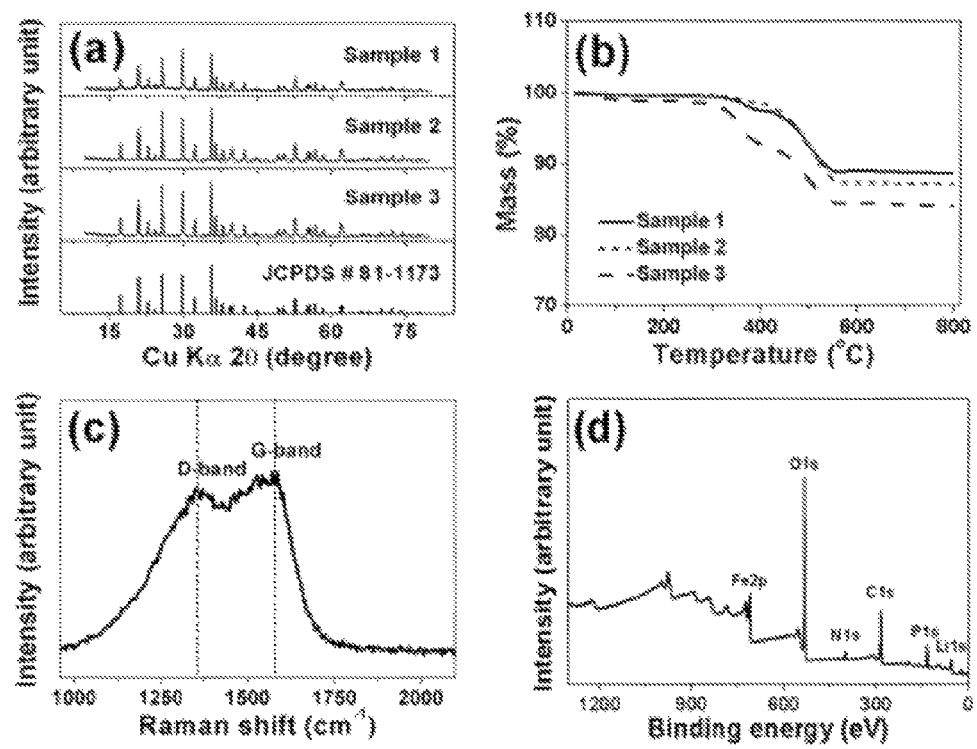
FIG. 3(A) depicts XRD patterns of $LiFePO_4$ samples coated with nitrogen-doped carbon layers.
FIG. 3(B) depicts the carbon-content of $LiFePO_4$ samples using thermo-gravimetric analysis (TGA).
FIG. 3(C) depicts the Raman spectroscopic analysis for a $LiFePO_4$ sample.
FIG. 3(D) depicts the thermo X-ray photoelectron spectrometer XPS survey spectra of a coated $LiFePO_4$ sample.

The XRD patterns of rod-like $LiFePO_4$ coated with nitrogen-doped carbon layers are shown in FIG. 3(a). For all of the samples obtained, all of the reflections could be indexed on the basis of the orthorhombic $LiFePO_4$ olivine structure-type (Pnma, JCPDS No. 81-1173).

The carbon content in the coated $LiFePO_4$ specimens was calculated using TGA methods, as shown in FIG. 3(b). They show a weight loss corresponding primarily to the removal of carbon from the samples as $CO_2$, indicating that samples 1, 2 and 3 evolve to approximately 12, 14, and 18 wt. % nitrogen-doped carbon, respectively. Sample 1 was further investigated by Raman spectroscopic analysis, as shown in FIG. 3(c). The modes at 1582 and 1357 $cm^{-1}$ correspond to, respectively, the G (ordered) and D (disordered) bands. The integrated intensity ratio ID/IG is an indication of the degree of graphitization. A high intensity ratio of 0.9, as compared to 0.09 in ordered synthetic graphite indicates a higher degree of disorder for the carbon present in the coated $LiFePO_4$.

The XPS survey spectra of coated $LiFePO_4$ rods are shown in FIG. 3(d). The peaks of P 1s, C 1s, N 1s, O 1s, and Fe 2p can be seen. Multiple C-bonding configurations were observed that were consistent with C/O and C/N bonding. Likewise, the N 1s spectra showed multiple bonding configurations, also consistent with C/N bonding.

FIGS. 4(a) and 4(b) show electrochemical performances for coated rod-like $LiFePO_4$ samples. The cyclability of the coated rod-like $LiFePO_4$ for all three samples between 4.3 and 2 V at C/10 are compared in FIG. 4(a). All three coated $LiFePO_4$ samples show good cyclability. Particularly, Sample 1 exhibits the best capacity retention of 122 mAh/g after 30 cycles among the three rod samples. The improved cyclability is related to the nitrogen-doped carbon layer and favorable morphology of the material, which is consistent with reports that coatings provide enhanced electrical conductivity between the substrate and the electrode. The rate and cycling performance of the coated rod-like $LiFePO_4$ samples are shown in FIG. 4(b). For comparison, a rod-like $LiFePO_4$ sample coated with carbon but without nitrogen ($LiFePO_4$—C) was prepared using glucose. The coated $LiFePO_4$ samples exhibit significantly higher rate capability than the $LiFePO_4$—C sample; for example, the coated sample retains a high capacity of 98 mAh/g at 5 C rates compared to a capacity of 73 mAh/g for the $LiFePO_4$—C sample, which implies that coated samples have a lower polarization inside the electrode.

Figure 5:
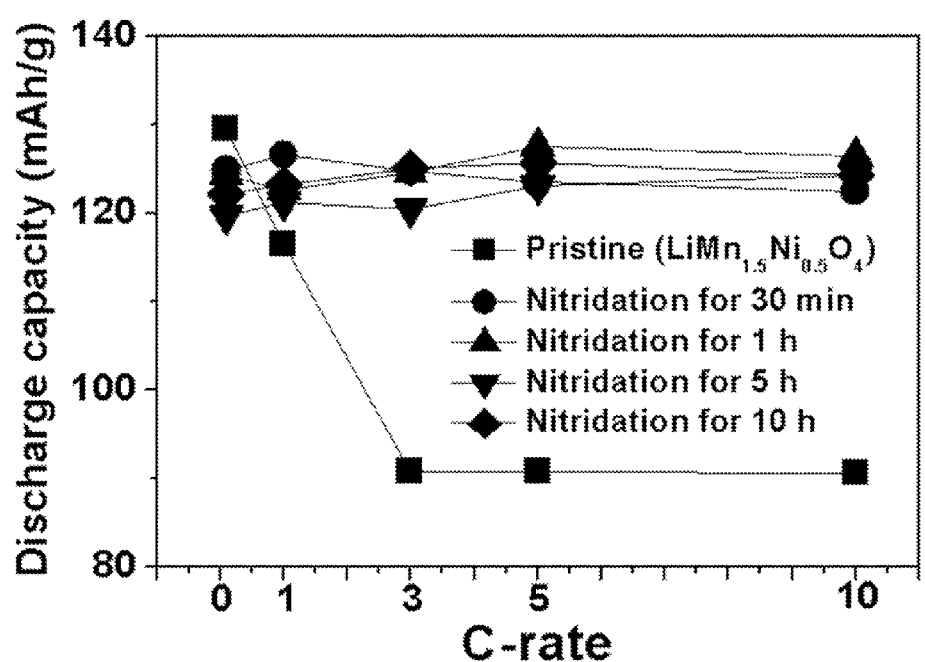
FIG. 5 depicts the discharge capacity of untreated and treated (annealed) $LiMn_{1.5}Ni_{0.5}O_4$ cathodes at C/10, 1 C, 3 C, 5 C, and 10 C.

FIG. 5 compares the discharge capacity/rate capability between an untreated $LiMn_{1.5}Ni_{0.5}O_4$ cathode, and various $LiMn_{1.5}Ni_{0.5}O_4$ cathodes that have undergone annealing/nitridation reactions for various periods of time (i.e., 30 min, 1 hour, 5 hours, and 10 hours). The modified/annealed samples exhibit improved rate capabilities over the untreated sample, and show stability even at 10 C.

What is claimed is:

1. A method of making a treated mesoporous metal oxide microsphere composition comprising:
    forming a mesoporous metal oxide microsphere composition having: (a) microspheres with an average diameter between 200 nm and 10 μm, and (b) mesopores on the surface and interior of the microspheres, wherein the mesopores have an average diameter between 1 nm and 50 nm and the microspheres have a surface area between 50 $m^2$/g and 500 $m^2$/g;
    treating the mesoporous metal oxide microspheres by doping with chromium and nitrogen; and optionally
    treating the mesoporous metal oxide microspheres by at least one method selected from the group consisting of:
        (i) annealing in a reducing atmosphere and (ii) coating with a coating composition.

2. The method of claim 1, wherein the metal oxide comprises at least one polymorph of titanium dioxide having at least 50 wt. % of a $TiO_2$ anatase polymorph or at least 50 wt. % of a $TiO_2$-B polymorph.

3. The method of claim 1, comprising annealing the mesoporous metal oxide microspheres in the reducing atmosphere, and the reducing atmosphere is selected from the group consisting of: hydrogen, argon, nitrogen, carbon dioxide, and mixtures thereof.

4. The method of claim 1, wherein the doping comprises the addition of between 2 mol. % and 5 mol. % of the chromium and nitrogen to the mesoporous metal oxide microspheres.

5. The method of claim 1, comprising coating the mesoporous metal oxide microspheres with the coating composition, and the coating composition is selected from the group consisting of nitrides, oxides, carbides, halides, borides, phosphides, and combinations thereof.

* * * * *